United States Patent
Tabata et al.

(10) Patent No.: US 7,035,402 B2
(45) Date of Patent: Apr. 25, 2006

(54) PORTABLE COMMUNICATION UNIT

(75) Inventors: Hajime Tabata, Saitama (JP); Yukio Miyamaru, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 947 days.

(21) Appl. No.: 09/949,804

(22) Filed: Sep. 12, 2001

(65) Prior Publication Data

US 2002/0032007 A1 Mar. 14, 2002

(30) Foreign Application Priority Data

Sep. 12, 2000 (JP) ............................. 2000-276381

(51) Int. Cl.
*H04M 1/00* (2006.01)
*H04M 9/00* (2006.01)

(52) U.S. Cl. ...................... 379/438; 379/442; 379/447; 455/90

(58) Field of Classification Search ................ 379/438, 379/446, 454, 442, 447; 439/4, 528; 242/378; 191/12.2 R
See application file for complete search history.

(56) References Cited

U.S. PATENT DOCUMENTS

| 2,231,768 | A | * | 2/1941 | Maxwell | 362/24 |
| 2,333,299 | A | * | 11/1943 | Deakin | 379/369 |
| 3,808,577 | A | * | 4/1974 | Mathauser | 439/39 |
| 6,373,364 | B1 | * | 4/2002 | Son et al. | 335/296 |

\* cited by examiner

*Primary Examiner*—Fan Tsang
*Assistant Examiner*—Aung T. Win
(74) *Attorney, Agent, or Firm*—Birch Stewart Kolasch & Birch LLP

(57) ABSTRACT

A portable communication unit is provided that permits a cord to be received and stored easily, while preventing undesired unwinding of the cord. Even when the communication unit is carried and stored together with a magnetic card containing data, a magnetic-side socket of a magnetic connector mounted at a front end of the cord is unlikely to influence the data on the magnetic card. The portable communication unit includes electric circuits having a predetermined communication function, a receptacle case holding the electrical circuits, a cord connected at one end thereof to the electric circuits and extending to the exterior of the receptacle case, and a magnetic-side socket of a magnetic connector provided at a front end of the cord.

13 Claims, 4 Drawing Sheets

PORTABLE COMMUNICATION UNIT

BACKGROUND OF THE INVENTION

1. Field of the Invention

The present invention relates to a portable communication unit, and more particularly to a portable communication unit capable of receiving an electric cord in a simple manner and in a well-fitted condition that maintains a nice-looking appearance in an accommodated state of the electric cord.

2. Description of the Background Art

A communication unit (INTERCOM) for permitting conversation between passengers on a saddle type vehicle, such as a two-wheeled motor vehicle, or between a passenger on a saddle type vehicle and a passenger on another vehicle there is known in the background art. In this type of communication unit (INTERCOM), a helmet of each passenger is equipped with a loudspeaker, a microphone, electrical contacts, and a communication unit wired with each other to permit conversation between the passengers. The communication unit can be mounted on the vehicle side and on the helmet of each passenger within the communication system.

The communication unit is detachably attached to the vehicle. When a passenger on the vehicle leaves the vehicle, a cord of the communication unit is detached from each helmet. The communication unit is removed from the vehicle body, and the cord is wound round the communication unit and is carried by the passenger together with the helmet.

In these types of arrangements, the cord extends from the communication unit in a cumbersome manner. When the communication unit is put into a pocket or a bag, the cord becomes an obstacle. Even if the cord is wound round the body of the communication unit, it has so far been impossible to fix a front end of the cord to the communication unit, resulting in that the cord is unwound within the pocket or bag. Thus, while carrying the communication unit, the manageability of the unit has not always been satisfactory.

Further, if the cord of the communication unit and an electrical contact on the helmet side are connected together with a magnet connector and a magnet-side socket of the magnet connector is mounted on the cord side, a magnetic force developed by the magnet is likely to exert an undesirable influence on any magnetic cards present within the pocket or bag.

SUMMARY OF THE INVENTION

The present invention overcomes the shortcomings associated with the background art and achieves other advantages not realized by the background art.

It is an object of the present invention to solve the above-mentioned problems of the prior art and provide a portable communication unit which permits a cord to be received easily and does not allow undesired unwinding of the cord.

It is an object of the present invention to reduce problems associated with magnetic connectors for the cord, even when the communication unit is carried together with a magnetic card. Accordingly, a magnet-side socket of a magnetic connector mounted at a front end of the cord is less likely to exert a bad influence on the magnetic card.

These and other objects of the present invention are accomplished by a portable communication unit comprising a receptacle case containing an electric circuit providing a predetermined communication function; a cord connected to the electric circuit and extending to an exterior of the receptacle case; and a magnetic connector provided at a front end of the cord, the magnetic connector including a magnetic-side socket, the magnetic-side socket having a socket chucking surface adapted to be clamped in a stored position by a magnetic force on an exposed surface of the receptacle case.

With the above-described configuration, the magnetic-side socket provided at the front end of the cord can be fixed to the socket chucking surface. Therefore, even if the cord is placed into a pocket or a bag in a wound state within the receptacle case, there is no risk of the cord unwinding.

These and other objects of the present invention are further accomplished by a portable communication unit comprising a receptacle case containing an electric circuit providing a communication function; a cord connected to the electric circuit and extending to an exterior of the receptacle case; a magnetic connector provided at a front end of the cord, the magnetic connector including a magnetic-side socket, the magnetic-side socket having a socket chucking surface adapted for clamping the magnetic-side socket in a stored position by a magnetic force to an exposed surface of the receptacle case; and a magnetic material sidesocket, the magnetic material side socket engageable with the magnetic side socket in an operating position by a magnetic force.

Further, since magnetic lines of force generated from the magnet-side socket provided at the front end of the cord do not leak to the exterior, even if the communication unit is carried together with a magnetic card, it is possible to diminish undesirable influences on magnetic information recorded on adjacent magnetic cards.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
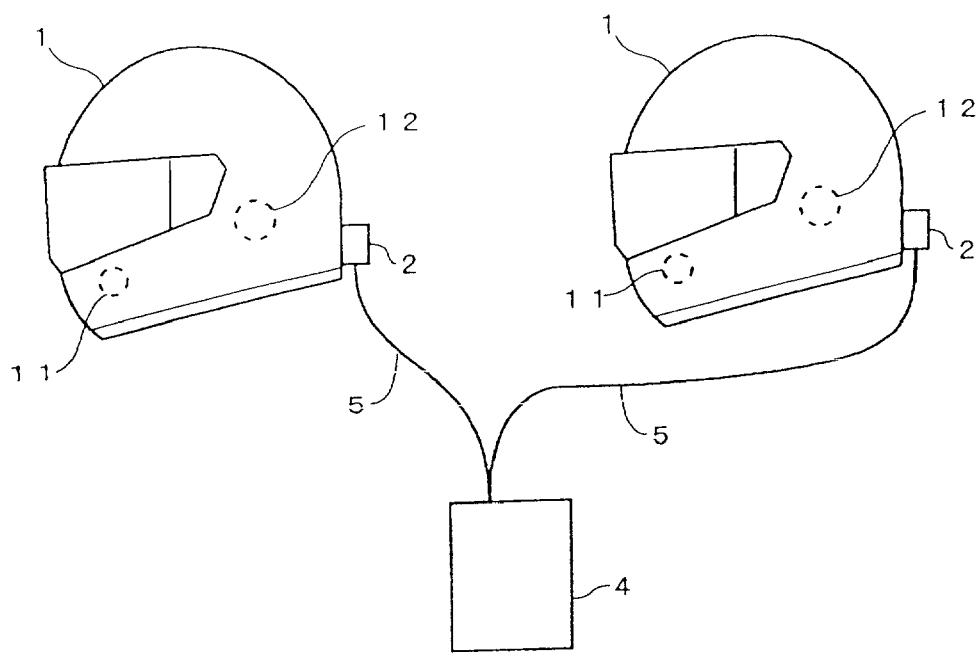
FIG. 1 is a schematic view of a configuration of a vehicular communication system according to an embodiment of the present invention.
Figure 2:
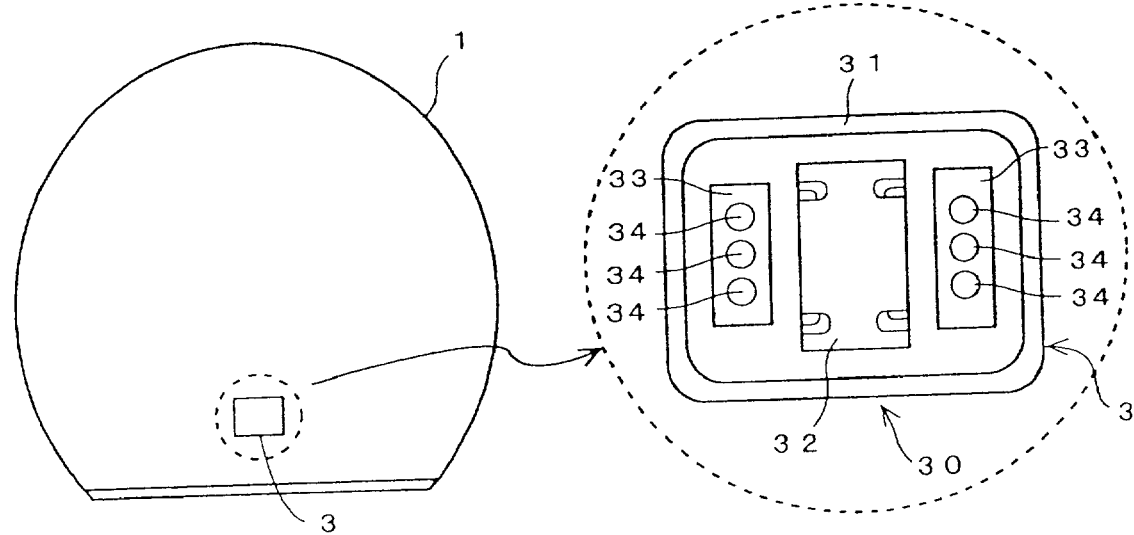
FIG. 2 is a rear view of a helmet shown without a magnet-side socket attached thereto.
Figure 3:
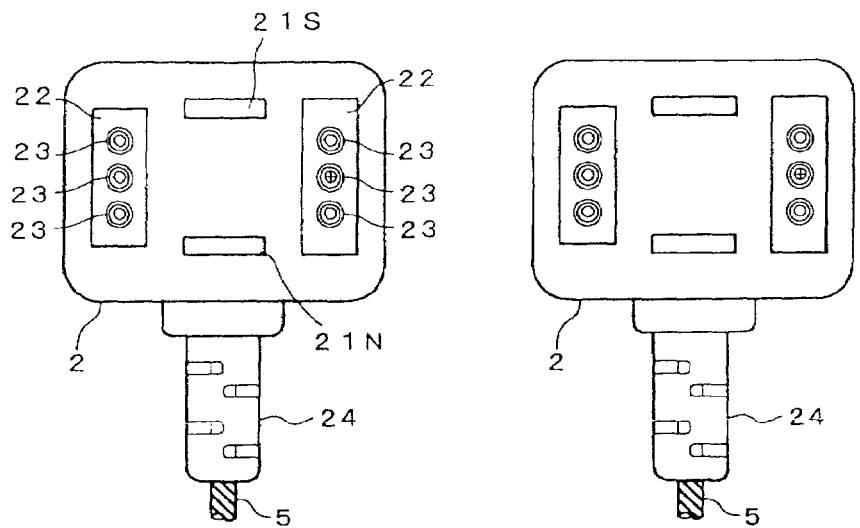
FIG. 3 is a plan view showing a configuration of the communication unit that includes a magnet-side socket and a cord according to an embodiment of the present invention.
Figure 3:
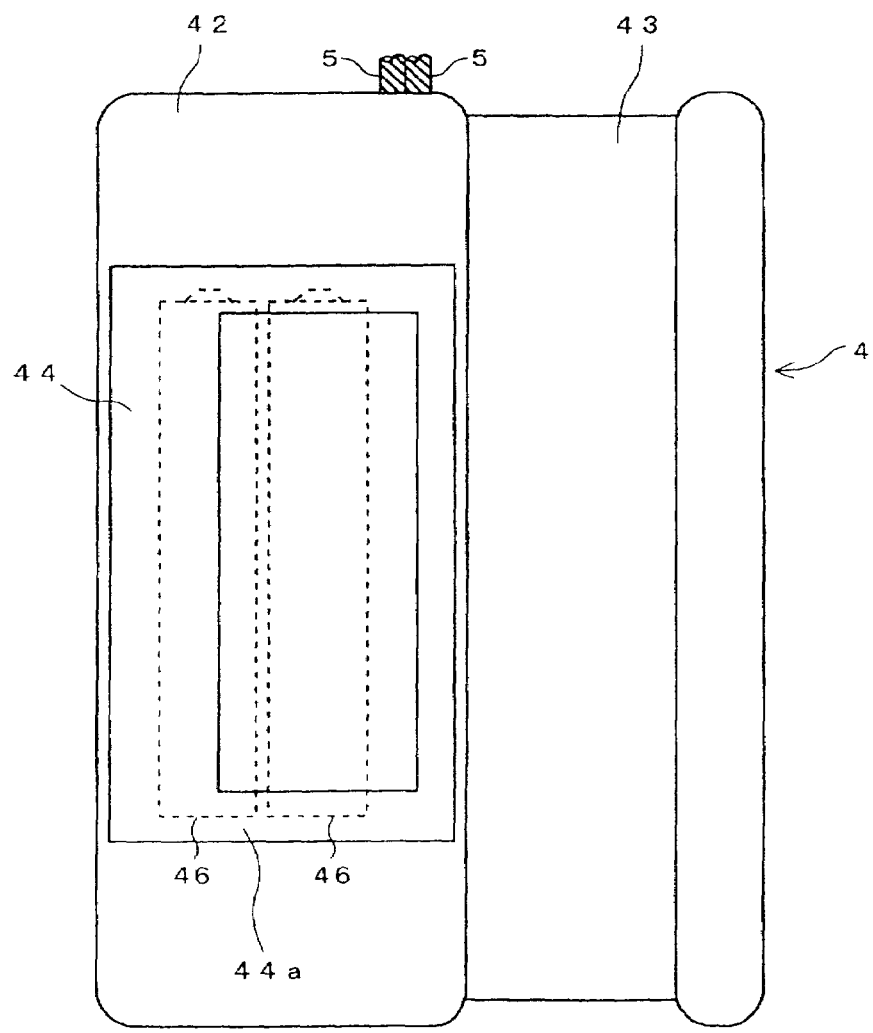
Figure 4:
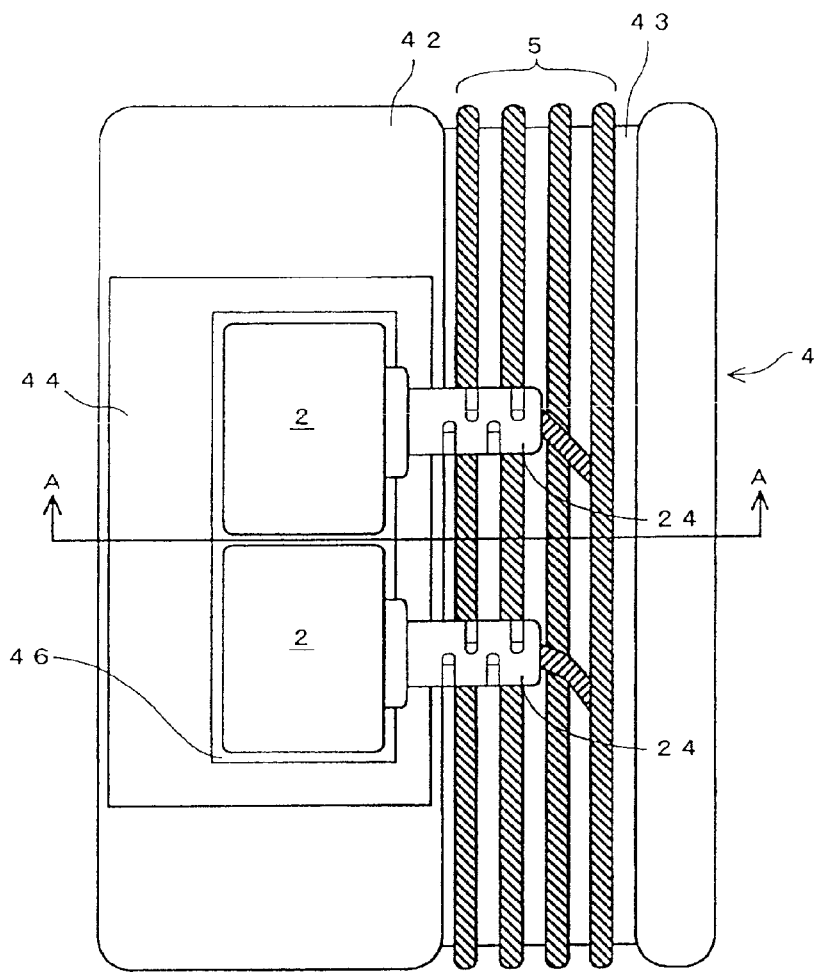
FIG. 4 is a plan view of a communication unit with a cord wound thereon.
Figure 5:
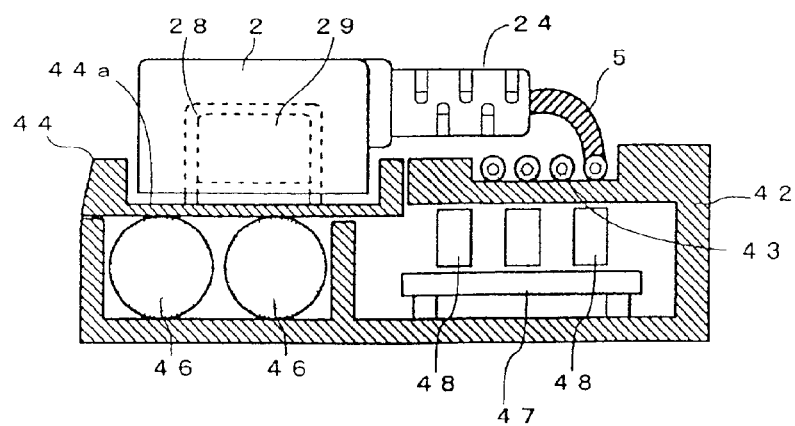
FIG. 5 is a sectional view of a first embodiment of the present invention.
Figure 6:
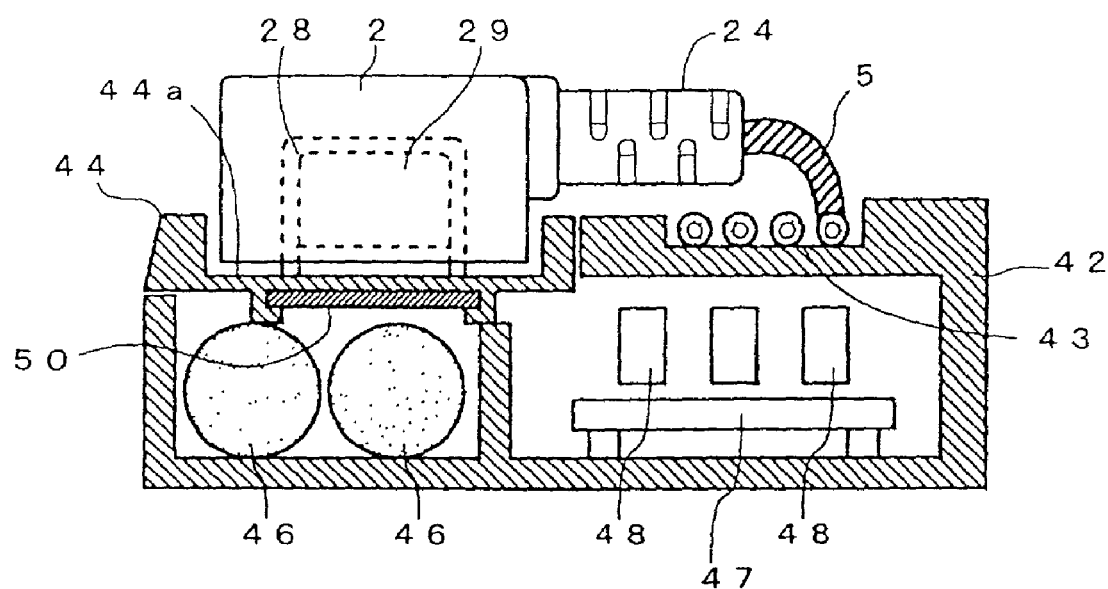
FIG. 6 is a sectional view of a second embodiment of the present invention.

The present invention will hereinafter be described with reference to the accompanying drawings. FIG. 1 is a schematic view of a configuration of a vehicular communication system according to an embodiment of the present invention. FIG. 2 is a rear view of a helmet shown without a magnet-side socket attached thereto. FIG. 3 is a plan view showing a configuration of the communication unit that includes a magnet-side socket and a cord according to an embodiment of the present invention. FIG. 4 is a plan view of a communication unit with a cord wound thereon. FIG. 5 is a sectional view of a first embodiment of the present invention. FIG. 6 is a sectional view of a second embodiment of the present invention.

FIG. 1 is a schematic view of a configuration of a vehicular communication system according to an embodiment of the present invention. An example will be described hereinafter in which communication is conducted between two passengers on the same vehicle. However, one of skill in the art will appreciate that the present invention can be applied to systems involving varying amounts of passengers and vehicles.

A helmet 1 worn by each passenger is equipped with a microphone 11 and a loudspeaker 12. External contacts of the microphone 11 and the loudspeaker 12 are exposed to the exterior in a magnetic material-side socket 3 (see FIG. 2) that is one socket of a magnetic connector.

A cord 5 extends from a communication unit 4 and a magnet-side socket 2 attached to a front end of the cord 5. The communication unit 4 is detachably fixed to the vehicle side, is attached to the body of any passenger, or is accommodated within the passenger's clothes. The helmet 1 and the cord 5 are connected together electrically and mechanically by means of a magnetic connector including the magnetic material-side socket 3 and the magnetic-side socket 2 in a corresponding pair.

FIG. 2 is a rear view of a helmet 1 shown without a magnet-side socket 2 attached thereto. A connecting surface of the magnetic material-side socket 3 in the magnetic connector is exposed to the rear side of the helmet at a lower position for connection with the cord 5 during an operating state. FIG. 2 includes an enlarged view of the magnetic material-side socket 3. An annular rib 31 erected along the periphery, a magnetic plate 32 fixed to a bottom, and plural electrodes 34 exposed to upper surfaces of island-like portions 33 which are raised from the bottom are formed on the connecting surface of the magnetic material-side socket 3.

FIG. 3 is a plan view showing a configuration of the communication unit 4 that includes a magnetic-side socket 2 and a cord 5 according to an embodiment of the present invention. An S-pole iron piece 21S, an N-pole iron piece 21N, and plural electrodes 23 exposed to a bottom of recess 22 are formed on a connecting surface of the magnetic-side socket 2. A buffer bush 24 through which the cord is drawn out extends in parallel with the connecting surface of the magnetic-side socket 2.

In this embodiment, as will be described later in greater detail, the buffer bush 24 includes features that prevent unwinding of the cord 5 and is therefore less flexible than a conventional buffer bush.

A cell lid 44 is fitted in a receptacle case 42 of the communication unit 4 for accommodating dry cells 46 within the case 42. A flat socket chucking surface 44a is provided on an exposed surface of the cell lid 44. A cord guide 43 that is recessed in the longitudinal direction is formed on the surface of the receptacle case 42.

FIG. 4 is a plan view of a communication unit 4 with a cord 5 wound thereon. FIG. 5 is a sectional view of a first embodiment of the present invention taken along line A—A in FIG. 4. The communication unit 4 includes various electronic components 48 mounted on a circuit board 47 for providing a desired communication function and forming at least one electric circuit. Two dry cells 46 serving as a power supply for the electronic components are also included within the communication unit 4.

When the passengers leave the vehicle, the magnetic-side socket 2 of the cord 5 is disengaged from the magnetic material-side socket 3 of each helmet 1 and the cord 5 is wound along the cord guide 43 formed on the surface of the case 42 of the communication unit 4. Lastly, the magnetic-side socket 2 attached to the front end of the cord 5 is pushed against the socket chucking surface 44a of the cell lid 44 with its connecting surface facing downward and in a direction in which the buffer bush 24 perpendicularly intersects the cord 5 in a stored operating position.

In this embodiment, as shown in FIG. 5, since the dry cells 46 are accommodated inside the socket chucking surface 44a, magnetic lines of force extending from the S-pole iron piece 21S of the magnetic-side socket 2 return to the N-pole iron piece 21N via the dry cells 46. That is, a closed magnetic path is formed between the magnetic-side socket 2 and the dry cells 46. The magnetic-side socket 2 is magnetically attracted to the socket chucking surface 44a of the magnetic-side socket 2. Thus, there is no risk of the cord 5 unwinding within the cord guide 43.

In this embodiment, when the magnetic-side socket 2 is attracted in a normal state to the socket chucking surface 44a, the buffer bush 24 crosses above the cord 5 that is wound within the cord guide 43 in a manner that prevents the cord 5 from being disengaged from the cord guide 43. Therefore, even if the communication unit is put into a pocket or a bag, it is possible to effectively prevent the cord 5 from unwinding.

Further, in this embodiment, as shown in FIG. 5, a magnet 29 of the magnetic-side socket 2 is covered on its rear and side faces with a magnetic core 28. Therefore, magnetic lines of force generated from the magnet 29 do not leak out to the rear and side faces of the magnetic-side socket 2. Magnetic lines of force generated from only the connecting surface of the magnetic-side socket 2 form a closed magnetic path between the magnetic-side socket 2 and the dry cells 46, and do not leak to the exterior. Therefore, even if the communication unit 4 with the cord 5 wound thereon is put into a pocket together with a magnetic card or the like, it is possible to diminish any undesirable influence on magnetic information recorded on the magnetic card stored with the communication unit 4.

FIG. 6 is a sectional view of a second embodiment of the present invention. Common elements shown in FIG. 6 have the same reference numerals as in the previous embodiments described hereinabove.

Although in the first embodiment a closed magnetic path is formed between the magnetic-side socket 2 and the dry cells 46 to allow the magnet-side socket to be attracted to the socket chucking surface 44a, the present invention is not limited thereto. An alternative embodiment is shown in FIG. 6 wherein a magnetic plate 50 is attached to the back of the cell lid 44 by supporting it with a rib or the like or by bonding to form a closed magnetic path between the magnetic-side socket 2 and the magnetic plate 50. This arrangement allows the magnetic-side socket 2 to be attracted to the socket chucking surface 44a.

The following beneficial effects are attained by the present invention. Since a socket chucking surface 44a is formed on the surface of the receptacle case 42 of the communication unit 4 and a magnetic-side socket 2 provided at a front end of a cord 5 extending from the communication unit 4 is magnetically attracted to the socket chucking surface 44a, the risk of the cord 5 unwinding is greatly reduced;

Since the magnetic-side socket 2 is attracted to the socket chucking surface 44a so that the buffer bush 24 crosses in a position above the cord 5, it is possible to effectively prevent unwinding of the wound cord 5. Since a recessed cord guide 43 is formed on the receptacle case 42 surface of the communication unit 4, unwinding of the wound cord 5 can be more effectively prevented.

Since magnetic lines of force generated from the magnetic-side socket 2 provided at the front end of the cord 5 form a closed magnetic path within the communication unit 4 and do not leak to the exterior, even if the communication unit is stored together with a magnetic card, it is possible to reduce or eliminate undesirable magnetic influence on the magnetic card.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable communication unit comprising:
   a receptacle case containing an electric circuit providing a communication function;
   a cord connected to said electric circuit and extending to an exterior of said receptacle case;
   a magnetic connector provided at a front end of said cord, said magnetic connector including a magnetic-side socket, said magnetic-side socket having a socket chucking surface adapted to be clamped in a stored position by a magnetic force on an exposed surface of said receptacle case a recessed cord guide formed on a surface of said receptacle case, wherein said magnetic-side socket has a buffer bush extending in parallel with a connecting surface of the magnetic-side socket and said socket chucking surface causes said magnetic-side socket to be chucked at a predetermined posture so that buffer bush of the magnetic-side socket crosses above the cord which is wound within said cord guide.

2. The portable communication unit according to claim 1, further comprising a dry cell accommodated in a projection area of said socket chucking surface, wherein said magnetic-side socket is attracted to the socket chucking surface with a magnetic attraction force created between the magnetic-side socket and said dry cell.

3. The portable communication unit according to claim 1, further comprising a magnetic plate in a projection area of said socket chucking surface, wherein said magnetic side socket is attracted to the socket chucking surface with a magnetic attraction force created between the magnetic-side socket and said magnetic plate.

4. A portable communication unit comprising:
   a receptacle case containing an electric circuit providing a communication function;
   a cord connected to said electric circuit and extending to an exterior of said receptacle case;
   a magnetic connector provided at a front end of said cord, said magnetic connector including a magnetic-side socket, said magnetic-side socket having a socket chucking surface adapted for clamping said magnetic-side socket in a stored position by a magnetic force to an exposed surface of said receptacle case; and
   a magnetic material side-socket, said magnetic material side socket engageable with said magnetic side socket in an operating position by a magnetic force,
   wherein said receptacle case includes:
      a plurality of dry cells within the receptacle case; and
      a cell lid fitted along an exterior of said receptacle case and forming said exposed surface of said receptacle case, said socket chucking surface formed on said exposed surface.

5. The communication unit according to claim 4, said magnetic material-side socket further comprising:
   an annular rib extending along a periphery;
   a magnetic plate fixed to a bottom surface of said magnetic material-side socket; and
   a plurality of electrodes formed on a connecting surface of the magnetic material-side socket for engaging with said magnetic-side socket.

6. The communication unit according to claim 4, said magnetic-side socket further comprising:
   an S-pole iron piece;
   an N-pole iron piece; and
   a plurality of electrodes formed on a connecting surface of the magnetic-side socket for engaging with said magnetic-material side socket in the operating position.

7. The communication unit according to claim 6, said magnetic material-side socket further comprising:
   an annular rib extending along a periphery;
   a magnetic plate fixed to a bottom surface of said magnetic material-side socket; and
   a plurality of electrodes formed on a connecting surface of the magnetic material-side socket for engaging with said magnetic-side socket.

8. The communication unit according to claim 6, said magnetic-side socket including a buffer bush extending in a direction parallel with said connecting surface of the magnetic-side socket and containing a portion of said cord.

9. The communication unit according to claim 6, said magnetic-side socket including a magnet covered on a rear and a side face with a magnetic core.

10. The communication unit according to claim 4, further comprising a cord guide recessed in a longitudinal direction of the communication unit and formed on an outer surface of said receptacle case.

11. The portable communication unit according to claim 10, wherein said magnetic-side socket has a buffer bush extending in parallel with the connecting surface of the magnetic-side socket, and said socket chucking surface causes said magnet-side socket to be chucked in a predetermined posture so that said buffer bush of the magnet-side socket crosses in a locking position above the cord which is wound within said cord guide.

12. The communication unit according to claim 4, further comprising a magnetic plate in a projection area of said socket chucking surface, wherein said magnetic-side socket is attracted to the socket chucking surface with a magnetic attraction force created between the magnetic-side socket and said magnetic plate.

13. A portable communication unit comprising:
a receptacle case containing an electric circuit providing a communication function;
a cord connected to said electric circuit and extending to an exterior of said receptacle case;
a magnetic connector provided at a front end of said cord, said magnetic connector including a magnetic-side socket, said magnetic-side socket including:
  a socket chucking surface adapted for clamping said magnetic-side socket in a stored position by a magnetic force to an exposed surface of said receptacle case, and
  a magnetic plate in a projection area of said socket chucking surface,
  wherein said magnetic-side socket is attracted to the socket chucking surface with a magnetic attraction force created between the magnetic-side socket and said magnetic plate; and
a magnetic material side-socket, said magnetic material-side socket engageable with said magnetic-side socket in an operating position by a magnetic force.

* * * * *